(12) United States Patent
Gadkari

(10) Patent No.: US 7,550,538 B2
(45) Date of Patent: Jun. 23, 2009

(54) CHLOROSULFONATED PROPYLENE/OLEFIN ELASTOMERS

(75) Inventor: Avinash C. Gadkari, Pearland, TX (US)

(73) Assignee: DuPont Performance Elastomers LLC, Wilmington, DE (US)

( * ) Notice: Subject to any disclaimer, the term of this patent is extended or adjusted under 35 U.S.C. 154(b) by 0 days.

(21) Appl. No.: 12/075,525

(22) Filed: Mar. 12, 2008

(65) Prior Publication Data

US 2008/0249249 A1  Oct. 9, 2008

Related U.S. Application Data

(60) Provisional application No. 60/921,590, filed on Apr. 3, 2007.

(51) Int. Cl.
| | |
|---|---|
| C08C 19/12 | (2006.01) |
| C08C 19/20 | (2006.01) |
| C08L 23/34 | (2006.01) |
| C08F 8/38 | (2006.01) |

(52) U.S. Cl. .................... 525/333.7; 525/343; 525/344; 525/353; 525/355; 525/356; 525/383

(58) Field of Classification Search ............... 525/333.7, 525/343, 344, 353, 355, 356, 383
See application file for complete search history.

(56) References Cited

U.S. PATENT DOCUMENTS

| 5,668,220 A | 9/1997 | Effler et al. |
| 7,109,269 B2 | 9/2006 | Stevens et al. |
| 7,273,908 B2 | 9/2007 | Ito et al. |

FOREIGN PATENT DOCUMENTS

| GB | 861542 | * | 2/1961 |
| WO | WO0001745 | | 1/2000 |

OTHER PUBLICATIONS

U.S. Appl. No. 12/075,647, filed Mar. 13, 2008, Ennis et al.
U.S. Appl. No. 12/075,770, filed Mar. 13, 2008, Ennis.
U.S. Appl. No. 12/075,768, filed Mar. 13, 2008, Ennis et al.
U.S. Appl. No. 12/075,769, filed Mar. 13, 2008, Ennis et al.
T. Huff and B. H. Johnson, The Preparation of Crystalline Polypropylene Sodium Sulfonates and Their Interaction with an Included Sodium Hydroxide Phase, Journal of Applied Polymer Science, 1973, pp. 553-564, vol. 17, John Wiley & Sons, Inc., USA.
Chemical Abstracts Service, Japanese Patent Application Kokai 52013540, published Feb. 1, 1977.

* cited by examiner

*Primary Examiner*—Roberto Rábago

(57) ABSTRACT

Chlorosulfonated propylene/olefin elastomers containing 0.5-55 weight percent chlorine and 0.15 to 5 weight percent sulfur are prepared from metallocene catalyzed propylene/olefin copolymer base resins having a ratio of Mw/Mn less than 3.5 and a copolymerized propylene content of 70-98 weight percent.

6 Claims, No Drawings

CHLOROSULFONATED PROPYLENE/OLEFIN ELASTOMERS

CROSS-REFERENCE TO RELATED APPLICATIONS

This application claims the benefit of U.S. Provisional Application No. 60/921,590 filed Apr. 3, 2007.

FIELD OF THE INVENTION

This invention relates to chlorosulfonated propylene/olefin elastomers, more particularly to chlorosulfonated elastomer copolymers comprising 70 to 98 weight percent copolymerized units of propylene and 2 to 30 weight percent copolymerized units of an olefin selected from the group consisting of i) ethylene and ii) alpha-olefins having between 4 and 20 carbon atoms.

BACKGROUND OF THE INVENTION

Propylene/olefin elastomers, made with a single site or metallocene catalyst, are commercially available from The Dow Chemical Company under the trade name Versify® and from ExxonMobil under the trade name Vistamaxx®. These elastomers are characterized in having propylene content less than 98 weight percent, narrow molecular weight distributions (MWD<3.5), density range of 0.85-0.89 g/cm$^3$, Tg<−10° C., and elastic recovery >80%. Such elastomers are disclosed in WO 00/01745, U.S. Pat. No. 7,109,269 B2 and in C. P. Bosniak et al., *Polymeric Materials: Science & Engineering* 2003, 89, 677. Propylene/olefin elastomers find use in applications such as impact modifiers, elastomeric film and fibers, compatibilizers, and polyolefin based thermoplastic elastomer applications e.g. molded goods.

Chlorosulfonated ethylene/alpha-olefin copolymers are known in the art. U.S. Pat. No. 5,668,220 discloses such copolymers made from metallocene catalyzed ethylene/alpha-olefin resins.

Chlorosulfonated polyethylene elastomers and chlorosulfonated ethylene copolymer elastomers have been found to be very good elastomeric materials for use in applications such as wire and cable jacketing, molded goods, automotive hose, power transmission belts, roofing membranes and tank liners. These materials are noted for their balance of oil resistance, thermal stability, ozone resistance and chemical resistance.

Chlorosulfonated propylene/ethylene copolymers useful as nucleating agents are disclosed in U.S. Pat. No. 3,903,059. These crystalline copolymers have >80% hot heptane insolubles.

Chlorosulfonated grafted (e.g. maleated) propylene/ethylene copolymers are disclosed in U.S. Pat. No. 5,527,571 as primers for promoting the adhesion of plastics in laminates.

It would be desirable to have chlorosulfonated propylene/olefin elastomers that are either amorphous, or contain a low level of crystallinity, wherein the chlorosulfonated elastomers are made from base resins of the metallocene catalyzed propylene/olefin elastomers described above. Such chlorosulfonated propylene/olefin elastomers would form soft, non-plasticized interlayer bonding agents for bonding polar materials to non polar flexible materials, e.g. barrier films. Other uses of these elastomers include to reactively incorporate stabilizers for increased thermal stability, or to be converted into functional groups not currently present in traditional grafted polypropylene base stocks.

SUMMARY OF THE INVENTION

An aspect of the present invention is a chlorosulfonated propylene/olefin copolymer composition comprising at least one chlorosulfonated propylene/olefin copolymer having 0.5 to 55 weight percent chlorine and 0.15 to 5 weight percent sulfur, based on total weight of said chlorosulfonated propylene/olefin copolymer, and wherein each of said chlorosulfonated propylene/olefin copolymers is produced from a different propylene/olefin copolymer comprising copolymerized units of 70 to 98 weight percent propylene and 2 to 30 weight percent, based on total weight of said propylene/olefin copolymer, of an olefin selected from the group consisting of i) ethylene and ii) an alpha-olefin having 4 to 20 carbon atoms, said propylene/olefin copolymer having a ratio of Mw/Mn less than 3.5.

DETAILED DESCRIPTION OF THE INVENTION

The chlorosulfonated propylene/olefin copolymers of this invention contain between 0.5 and 55, preferably between 1 and 45, most preferably between 1 and 35 weight percent (wt. %) chlorine and between 0.15 and 5, preferably between 0.2 and 3, most preferably between 0.5 and 2 weight percent (wt. %) sulfur. These copolymers may be made in a solution chlorosulfonation process from at least one metallocene catalyzed propylene/olefin copolymer base resin. For some end use applications, it may be desirable to employ 2 or more different (e.g. different monomers, different molecular weight distributions, etc.) base resins in order to tailor the properties of the resulting composition to the end use.

The propylene/olefin copolymers employed to make the chlorosulfonated copolymers of the invention are commercially available from The Dow Chemical Company under the trade name Versify® and from ExxonMobil under the trade name Vistamaxx®. Such copolymers and their preparation are disclosed in WO 00/01745, U.S. Pat. No. 7,109,269 B2 and in C. P. Bosniak et al., *Polymeric Materials: Science & Engineering* 2003, 89, 677. These copolymers comprise 70 to 98, preferably 75 to 95, most preferably 80 to 95 wt. % copolymerized units of propylene and 2 to 30, preferably 5 to 25, most preferably 5 to 20 wt. % copolymerized units of an olefin selected from the group consisting of i) ethylene and an alpha-olefin containing 4 to 20 carbon atoms. Preferably, the olefin is ethylene. The base resin copolymers are amorphous or contain only a very low level of crystallinity as evidenced by being substantially soluble in hot heptane.

The propylene/olefin copolymers are made in the presence of a single site or metallocene catalyst resulting in a substantially linear copolymer. Due to the catalyst employed in the polymerization process, these copolymers have a relatively narrow molecular weight distribution, Mw/Mn, of less than 3.5, preferably less than 3.0. The density of these copolymers is between 0.850 and 0.89, preferably 0.855 to 0.88 g/cm$^3$. Preferably, these elastomers are also characterized in having a Tg<−10° C. and an elastic recovery greater than 80%.

Optionally, the base resin that is chlorosulfonated to make the chlorosulfonated propylene/olefin copolymers of this invention may be a blend of two or more different propylene/olefin copolymers.

In one chlorosulfonation process, particularly suited for the production of copolymers containing 10 weight percent or less Cl, sulfur dioxide and chlorine gas are employed in the reaction. In this process, a solvent (e.g. carbon tetrachloride) is introduced to a reactor having a condenser and pressure control. Next, a quantity of propylene/olefin copolymer base resin (described above) is added to the reactor. Optionally, more than one propylene/olefin copolymer may be added to the reactor so as to result in a blend of different (e.g. different molecular weight distribution, comonomer levels, etc.) chlorosulfonated propylene/olefin copolymers. Optionally, any moisture in the reactor may be removed by addition of a small amount of a scavenger such as thionyl chloride. The reactor is purged with nitrogen to remove air and the pressure raised to 20-25 psi (138 to 172 kPa). The reactor contents are heated to about 70° C. or more and agitated for about 30 minutes to dissolve all of the copolymer. After reducing the temperature to 55°-65° C. (depends on the type of azo initiator used in the process), sulfur dioxide and an azo-type initiator in a chloroform solution (e.g. Vazo® 52 initiator, available from DuPont) is introduced to the reactor. After about 10 minutes, a very low flow rate of chlorine is introduced to the reactor. The reaction is continued for 30 to 180 minutes, during which time small samples are taken from the reactor to monitor for chlorine and sulfur levels on the copolymer. When a desired level of chlorine and sulfur is reached, all flows are stopped and, the reaction mass is depressurized to 0 psi (0 Pa). Optionally, depressurization may be done after raising the temperature to 80° C. Also optionally, depressurization may be followed by application of a vacuum (−4 to −5 psi (−27.6 to −34.5 kPa) to eliminate gases generated during the reaction. An epoxide, e.g. Epon® resin 828 (the reaction product of bisphenol A and epichlorohydrin, available from Hexion Specialty Chemicals), is added to stabilize the product. Chlorosulfonated propylene/olefin copolymer is isolated from solvent by heating and then the copolymer is dried. A preferred isolation process is drum drying where the polymer solution is contacted with a heated drum that flashes the solvent, depositing the polymer as a thin film that is removed to recover the polymer.

In another chlorosulfonation process, chlorine, sulfuryl chloride (and optionally sulfur dioxide) are employed. Depending on reaction conditions, this process may be used for making copolymers having 10 or less weight percent chlorine or up to 55 weight percent chlorine. This chlorosulfonation process differs from the above process in that i) sulfur dioxide addition is optional, and 2) after chlorine gas has been fed to the reactor for about 5 minutes, a flow of sulfuryl chloride is initiated. To make a chlorosulfonated propylene/olefin copolymer having a chlorine level more than 10 weight percent, a higher chlorine gas flow rate is employed and the reaction is run at a higher temperature, e.g. 90°-95° C. rather than 55°-65° C.

The chlorosulfonated propylene/olefin copolymers of this invention have a variety of end uses such as modifiers in polar resins, compatibilizers, coupling agents, adhesion promoters, alloys, composites, viscosity modifiers, etc.

Compounds of the chlorosulfonated copolymers of the invention may be formulated to contain curatives and other additives typically employed in traditional chlorosulfonated polyolefin compounds.

Useful curatives include bismaleimide, peroxides (e.g. Di-Cup®), sulfur donors (e.g. dithiocarbamyl polysulfides) and metal oxides (e.g. MgO).

Examples of additives suitable for use in the compounds include, but are not limited to i) fillers; ii) plasticizers; iii) process aids; iv) acid acceptors; v) antioxidants and vi) antiozonants.

EXAMPLES

Test Methods

Mole percent ethylene in copolymer base resins was measured by $^{13}$C NMR and converted to weight percent (wt. %). In this analysis, about 620 mg of copolymer was cut into small pieces and dissolved in heated 1, 2, 4-trichlorobenzene. Spectra were acquired on a Bruker Avance DRX NMR at 120° C. for 6.5 hours (768 scans, recycle delay of 30 seconds, acquisition time of 0.64 seconds, pw90 of 14.5 seconds, inverse-gated proton decoupling.

Weight percent Cl and S incorporated in chlorosulfonated copolymers was measured by the Schoniger combustion method for analysis (J. C. Torr and G. J. Kallos, *American Industrial Association J*. July, 419 (1974) and A. M. MacDonald, *Analyst*, v86, 1018 (1961)). A sample of polymer is combusted in a Schoniger oxygen flask containing hydrogen peroxide. Excess hydrogen peroxide is neutralized with formaldehyde. An aliquot of the resulting solution is titrated with lead perchlorate, using a lead-sensitive electrode for sulfur analysis. Another aliquot is titrated with silver nitrate, using a silver-sensitive electrode for chlorine analysis.

The percent of —$SO_2Cl$ groups on the chlorosulfonated propylene/olefin copolymers was estimated by FTIR by monitoring the characteristic —$SO_2Cl$ peak at 1160 to 1170 $cm^{-1}$.

The propylene/ethylene base resins employed in these examples were Exxon Mobil Vistamaxx® VM 6100 having 20.9 mole percent (15.0 wt. %) ethylene units and a density of 0.855 g/cm$^3$; VM 1100 having 22.3 mole percent (16.1 wt %) ethylene and density of 0.861 g/cm$^3$; VM 1120 having 21.2 mole percent (15.2 wt. %) ethylene and a density of 0.861 g/cm$^3$ and VM 2125 having a density of 0.865 g/cm$^3$ and MFR of 80. All of these resins have a Mw/Mn less than 3.5.

Initiators were Vazo® initiators, available from DuPont.

Example 1

Chlorosulfonated propylene/olefin copolymers of the invention having a chlorine level of less than 10 weight percent were made in the following general process. Specific reaction conditions are given hereinafter for each copolymer prepared (Samples 1-3)

A 10 gallon (37.9 L) autoclave reactor was charged with 25 to 40 Lbs. (11.3 to 18.1 kg) of carbon tetrachloride solvent and 1.5 to 3 Lbs. (0.68 to 1.36 kg) of a single propylene/olefin copolymer or a blend of two grades of propylene/olefin copolymers. 20 ml of thionyl chloride was added to the reactor as a moisture scavenger. The reactor pressure was increased to 20 to 25 psi (138 to 172 kPa) by using nitrogen gas. The polymer was dissolved in the solvent by raising and maintaining the reactor temperature at or above 70° C. for about 30 minutes under continuous agitation. The reactor temperature was then lowered to about 55° to 65° C., depending on the azo initiator employed. An initiator solution was prepared in chloroform by dissolving about 100 g of initiator in 4 L of solvent. This solution was poured into a burette and a continuous flow of this initiator solution was fed into the reactor via a dispensing pump at a rate of approximately 3-10 ml/minute. About 10 minutes after the start of initiator flow, a very low flow of chlorine gas was started through a rotometer into the reactor at a flow rate of 0.1 Lbs./hours (hr) (45 g/hr). After about 5 minutes of chlorine flow, 50-200 ml. of sulfuryl chloride (in a burette) was dispensed into the reactor via a pump at a flow rate of 30-50 ml/minute. The burette was re-filled with carbon tetrachloride and was dispensed into the reactor to purge the line. For Samples 2 and 3, an optional low flow rate of sulfur dioxide was introduced into the reactor 45-50 minutes after the start of the reaction.

The reaction was continued for about 30 to 180 minutes during which time small samples were taken from the reactor and analyzed by FTIR spectroscopy to monitor the chlorine and sulfur content in the chlorosulfonated polymer. After the reaction was completed, the reactor was depressurized to 0 psi (0 kPa) pressure. Optionally the reactor temperature was raised to above 80° C. and then the reactor was depressurized to 0 psi (0 Pa) pressure. Also optionally reactor depressurization was followed by pulling a vacuum (−4 to −5 psi (−27.6 to −34.3 kPa) pressure) on the reactor with the use of an aspirator for 15 to 30 minutes. Reactor depressurization and vacuuming is done to eliminate acidic gasses generated during the reaction. About 10 g of stabilizer, Epon® resin 828, was dissolved in carbon tetrachloride and this solution was added to the reactor. The reaction solution was then discharged, filtered and collected in a bucket containing about 1 g of Irganox® 1010 (available from Ciba Specialty Chemicals) stabilizer. The chlorosulfonated polymer was isolated by evaporation of solvent on a drum dryer with heated drums.

The following chlorosulfonated polymers were prepared by employing this process and the specific reaction conditions shown below.

Sample 1

| Feedstock: | 3.0 Lbs. (1.36 kg) of Vistamaxx ® VM 1100 polymer |
|---|---|
| Solvent: | 30 Lbs. (13.6 kg) of carbon tetrachloride |
| Sulfuryl chloride: | 200 ml |
| Azo initiator: | Vazo ® 52 [2,2'-azobis (2,4-dimethylvaleronitrile)] |
| Reactor temp.: | 60° C. |
| Reaction time: | 35 minutes |

By Schoniger analysis, the chlorosulfonated copolymer contained Cl = 6.0 wt. % and S = 0.5 wt. %

Sample 2

| Feedstock: | 3.0 Lbs. (1.36 kg) of Vistamaxx ® VM 1100 polymer |
|---|---|
| Solvent: | 40 Lbs. (18.1 kg) of carbon tetrachloride |
| Sulfuryl chloride: | 100 ml. |
| Azo initiator: | Vazo ® 64 [2,2'-Azobisisobutyronitrile] |
| Reactor temp.: | 67°-69° C. |
| Reaction time: | 110 minutes |

After about 50 minutes from the start of the reaction, a flow of sulfur dioxide gas was started through a rotometer into the reactor at a rate of 1 Lbs/hr (0.45 kg/hr). By Schoniger analysis, the chlorosulfonated polymer contained Cl = 5.4 wt. % and S = 0.9 wt. %

Sample 3

| Feedstock: | 3.0 Lbs. (1.36 kg) of Vistamaxx ® VM 1100 polymer |
|---|---|
| Solvent: | 30 Lbs. (13.6 kg) of carbon tetrachloride |
| Sulfuryl chloride: | 100 ml. |
| Azo initiator: | Vazo ® 52 [2,2'-azobis (2,4-dimethylvaleronitrile)] |
| Reactor temp.: | 55°-58° C. |
| Reaction time: | 80 minutes |

After about 45 minutes from the start of the reaction, a flow of sulfur dioxide gas was started through a rotometer into the reactor at a rate of 1 Lbs/hr (0.45 kg/hr). By Schoniger analysis, the chlorosulfonated polymer contained Cl = 6.2 wt. % and S = 1.35 wt. %

Example 2

Chlorosulfonated propylene/olefin copolymers of the invention having a chlorine level of less than 10 weight percent were made in the following general process. Specific reaction conditions are given hereinafter for each copolymer prepared (Samples 4-7) A 10 gallon (37.9 L) autoclave reactor was charged with 25 to 40 Lbs. (11.3 to 18.1 kg) of carbon tetrachloride solvent and 1.5 to 3 Lbs. (0.68 to 1.36 kg) of a single propylene-olefin copolymer or a blend of two grades of propylene-olefin copolymers. For Sample 7, 20 ml of thionyl chloride was added to the reactor as a moisture scavenger. The reactor pressure was raised to 20 to 25 psi (138 to 172 kPa) by using nitrogen gas. The polymer was dissolved in the solvent by raising and maintaining the reactor temperature at or above 70° C. for about 30 minutes under continuous agitation. The reactor temperature was then lowered to about 550 to 65° C., depending on the initiator used. An initiator solution was prepared by dissolving about 100 g of an azo initiator in 4 liters of chloroform. This solution was poured into a burette and a continuous flow of this initiator solution was fed into the reactor via a dispensing pump at a rate of approximately 3-10 ml/minute. A flow of sulfur dioxide gas was started through a rotometer into the reactor and the reactor pressure was raised to about 2 psi (13.8 kPa). The reactor pressure was then increased to 20 to 25 psi (138 to 172 kPa) by a flow of nitrogen gas. Sulfur dioxide gas was continuously fed to the reactor through a rotometer at a rate of 0.1 Lbs/hr (0.45 kg/hr). About 10 minutes later, a very low flow rate of chlorine gas was started through a rotometer into the reactor at a rate of 1 Lbs/hr (45 g/hr). The reaction was continued for about 30 to 180 minutes during which time small samples were taken from the reactor and analyzed by FTIR spectroscopy to monitor the chlorine and sulfur content in the chlorosulfonated polymer. After the reaction, the reactor was depressurized to 0 psi (0 kPa) pressure. Optionally reactor temperature was raised to above 80° C. and then the reactor was depressurized to 0 psi (0 Pa) pressure. Optionally reactor depressurization was followed by pulling a vacuum (−4 to −5 psi pressure, −27.6 to −34.5 kPa) on the reactor with the use of an aspirator for 15 to 30 minutes. Reactor depressurization and vacuuming was done to eliminate acidic gasses generated during the reaction. About 10 g of stabilizer, Epon® resin 828, was dissolved in carbon tetrachloride and this solution was added to the reactor. The reaction solution was discharged from the reactor, filtered and collected in a bucket containing about 1 g of Irganox® 1010 stabilizer. The chlorosulfonated polymer was isolated by evaporation of solvent on a drum dryer.

The following chlorosulfonated polymers were prepared by employing this process and the specific reaction conditions shown below.

Sample 4

| Feedstock: | 3.0 Lbs. (1.36 kg) of Vistamaxx ® VM 1100 polymer |
|---|---|
| Solvent: | 40 Lbs. (18.1 kg) of carbon tetrachloride |
| Azo initiator: | Vazo ® 52 [2,2'-azobis (2,4-dimethylvaleronitrile)] |
| Reactor temp.: | 55°-61° C. |
| Reaction time: | 85 minutes |

By Schoniger analysis, the chlorosulfonated polymer contained Cl = 1.7 wt. % and S = 0.6 wt. %

Sample 5

| Feedstock: | 3.0 Lbs. (1.36 kg) of Vistamaxx ® VM 1100 polymer |
|---|---|
| Solvent: | 40 Lbs. (18.1 kg) of carbon tetrachloride |
| Azo initiator: | Vazo ® 52 [2,2'-azobis (2,4-dimethylvaleronitrile)] |
| Reactor temp.: | 57°-59° C. |
| Reaction time: | 95 minutes |

By Schoniger analysis, the chlorosulfonated polymer contained Cl = 1.2 wt. % and S = 0.45 wt. %

Sample 6

| | |
|---|---|
| Feedstock: | 3.0 Lbs. (1.36 kg) of Vistamaxx ® VM 1120 polymer |
| Solvent: | 35 Lbs. (15.9 kg) of carbon tetrachloride |
| Azo initiator: | Vazo ® 52 [2,2'-azobis (2,4-dimethylvaleronitrile)] |
| Reactor temp.: | 52°-56° C. |
| Reaction time: | 142 minutes |

By Schoniger analysis, the chlorosulfonated polymer contained Cl = 1.8 wt. % and S = 0.6 wt. %

Sample 7

| | |
|---|---|
| Feedstock: | 1.5 Lbs. (0.68 kg) of Vistamaxx ® VM 6100 |
| Solvent: | 25 Lbs. (11.3 kg) of carbon tetrachloride |
| Moisture scavenger: | 20 ml of thionyl chloride |
| Azo initiator: | Vazo ® 52 [2,2'-azobis(2,4-dimethylvaleronitrile)] |
| Reactor temp.: | 56° C. |
| Reaction time: | 45 minutes |

By Schoniger analysis, the chlorosulfonated polymer contained Cl = 0.9 wt. % and S = 0.35 wt. %

Example 3

Chlorosulfonated propylene/olefin copolymers of the invention having a chlorine level of more than 10 weight percent were made in the following general process. Specific reaction conditions are given hereinafter for each copolymer prepared (Samples 8-18).

A 10 gallon (37.9 L) autoclave reactor was charged with 25 to 40 Lbs. (11.3 to 18.1 kg) of carbon tetrachloride solvent and 1.5 to 3 Lbs. (0.68 to 1.36 kg) of a single propylene-olefin copolymer or a blend of two grades of propylene-olefin copolymers. The reactor pressure was raised to 20 to 25 psi (138 to 172 kPa) by using nitrogen gas. The polymer was dissolved in the solvent by increasing and maintaining the reactor temperature at or above 70° C. for about 30 minutes under continuous agitation. The reactor temperature was then increased and maintained between 90°-95° C. before starting the reaction. An initiator solution was prepared by dissolving about 100 g of an azo initiator in 4 liters of chloroform. This solution was poured into a burette and a continuous flow of this initiator solution was fed into the reactor via a dispensing pump at a rate of approximately 3-10 ml/minute. About 10 minutes after initiator flow was started, a flow of chlorine gas was started through a rotometer into the reactor at approximately 1 Lb/hour (0.45 kg/hr) rate. After about 5 minutes, 50-400 ml. of sulfuryl chloride in a burette was dispensed into the reactor via a pump at a rate of 25 to 30 ml/minute. The burette was refilled with carbon tetrachloride and then dispensed into the reactor to purge the line of sulfuryl chloride. The reaction was continued for about 30 to 250 minutes during which time small samples were taken from the reactor and analyzed by FTIR spectroscopy to monitor the chlorine and sulfur content in the chlorosulfonated polymer. During the reaction, the reactor temperature ranged from about 80° to 105° C., depending on the targeted composition of chlorosulfonated polymer. After the reaction was complete all flows were stopped and the reactor was depressurized to 0 psi (0 kPa) pressure. About 10 to 20 g of stabilizer, Eppn® resin 828, was dissolved in carbon tetrachloride and this solution was added to the reactor. The reaction solution was discharged from the reactor, filtered and collected in a bucket containing about 1 g of Irganox® 1010 stabilizer. The chlorosulfonated polymer was isolated by evaporation of solvent on a drum dryer.

The following chlorosulfonated polymers were prepared by employing this process and the specific reaction conditions shown below.

Sample 8

| | |
|---|---|
| Feedstock: | 3 Lbs. (1.36 kg) of Vistamaxx ® VM 1100 |
| Solvent: | 35 Lbs. (15.88 kg) of carbon tetrachloride |
| Sulfuryl chloride: | 100 ml. |
| Azo initiator: | Vazo ® 64 [2,2'-Azobisisobutyronitrile] |
| Reactor temp.: | 92°-104° C. |
| Reaction time: | 175 minutes |

By Schoniger analysis, the chlorosulfonated polymer contained Cl = 20.4 wt. % and S = 0.26 wt. %

Sample 9

| | |
|---|---|
| Feedstock: | 3 Lbs. (1.36 kg) of Vistamaxx ® VM 1100 |
| Solvent: | 35 Lbs. (15.88 kg) of carbon tetrachloride |
| Sulfuryl chloride: | 100 ml. |
| Azo initiator: | Vazo ® 64 [2,2'-Azobisisobutyronitrile] |
| Reactor temp.: | 87°-91° C. |
| Reaction time: | 85 minutes |

By Schoniger analysis, the chlorosulfonated polymer contained Cl = 11.2 wt. % and S = 0.6 wt. %

Sample 10

| | |
|---|---|
| Feedstock: | Blend of Vistamaxx ® polymers [953 g of VM 1120 & 408 g of VM 1100] |
| Solvent: | 30 Lbs. (13.6 kg) of carbon tetrachloride |
| Sulfuryl chloride: | 150 ml. |
| Azo initiator: | Vazo ® 64 [2,2'-Azobisisobutyronitrile] |
| Reactor temp.: | 85°-95° C. |
| Reaction time: | 108 minutes |

By Schoniger analysis, the chlorosulfonated polymer contained Cl = 18.7 wt. % and S = 0.89 wt. %

Sample 11

| | |
|---|---|
| Feedstock: | Blend of Vistamaxx ® polymers [1089 g VM 1120 & 272 g VM 6100] |
| Solvent: | 30 Lbs. (13.6 kg) of carbon tetrachloride |
| Sulfuryl chloride: | 200 ml. |
| Azo initiator: | Vazo ® 64 [2,2'-Azobisisobutyronitrile] |
| Reactor temp.: | 82°-87° C. |
| Reaction time: | 58 minutes |

By Schoniger analysis, the chlorosulfonated polymer contained Cl = 16 wt. % S = 1.57 wt. %

Sample 12

| | |
|---|---|
| Feedstock: | 3 Lbs. (1.36 kg) of Vistamaxx ® VM 2125 |
| Solvent: | 30 Lbs. (13.6 kg) of carbon tetrachloride |
| Sulfuryl chloride: | 200 ml. |
| Azo initiator: | Vazo ® 64 [2,2'-Azobisisobutyronitrile] |
| Reactor temp.: | 84°-87° C. |
| Reaction time: | 124 minutes |

By Schoniger analysis, the chlorosulfonated polymer contained Cl = 18.4 wt. % and S = 1.77 wt. %

Sample 13

| Feedstock: | 3 Lbs. (1.36 kg) of Vistamaxx ® VM 2125 |
| --- | --- |
| Solvent: | 30 Lbs. (13.6 kg) of carbon tetrachloride |
| Sulfuryl chloride: | 100 ml. |
| Azo initiator: | Vazo ® 64 [2,2'-Azobisisobutyronitrile] |
| Reactor temp.: | 90°-104° C. |
| Reaction time: | 103 minutes |

By Schoniger analysis, the chlorosulfonated polymer contained Cl = 22.8 wt. % and S = 0.16 wt. %

Sample 14

| Feedstock: | 2 Lbs. (0.91 kg) of Vistamaxx ® VM 6100 |
| --- | --- |
| Solvent: | 25 Lbs. (11.3 kg) of carbon tetrachloride |
| Sulfuryl chloride: | 100 ml. |
| Azo initiator: | Vazo 64 [2,2'-Azobisisobutyronitrile] |
| Reactor temp.: | 96°-101° C. |
| Reaction time: | 52 minutes |

By Schoniger analysis, the chlorosulfonated polymer contained Cl = 18.2 wt. % and S = 0.73 wt. %

Sample 15

| Feedstock: | 2.5 Lbs. (1.13 kg) of Vistamaxx ® VM 1100 |
| --- | --- |
| Solvent: | 30 Lbs. (13.6 kg) of carbon tetrachloride |
| Sulfuryl chloride: | 150 ml. |
| Azo initiator: | Vazo ® 64 [2,2'-Azobisisobutyronitrile] |
| Reactor temp.: | 91°-95° C. |
| Reaction time: | 60 minutes |

By Schoniger analysis, the chlorosulfonated polymer contained Cl = 19.2 wt. % and S = 0.97 wt. %

Sample 16

| Feedstock: | 2.5 Lbs. (1.13 kg) of Vistamaxx ® VM 1120 |
| --- | --- |
| Solvent: | 25 Lbs. (11.3 kg) of carbon tetrachloride |
| Sulfuryl chloride: | 150 ml. |
| Azo initiator: | Vazo ® 64 [2,2'-Azobisisobutyronitrile] |
| Reactor temp.: | 90°-95° C. |
| Reaction time: | 72 minutes |

By Schoniger analysis, the chlorosulfonated polymer contained Cl = 20.7 wt. % and S = 0.68 wt. %

Sample 17

| Feedstock: | 2.5 Lbs. (1.13 kg) of Vistamaxx ® VM 1120 |
| --- | --- |
| Solvent: | 30 Lbs. (13.6 kg) of carbon tetrachloride |
| Sulfuryl chloride: | 160 ml. |
| Azo initiator: | Vazo ® 64 [2,2'-Azobisisobutyronitrile] |
| Reactor temp.: | 90°-93° C. |
| Reaction time: | 108 minutes |

By Schoniger analysis, the chlorosulfonated polymer contained Cl = 20.5 wt. % and S = 1.07 wt. %

Sample 18

| Feedstock: | 1.5 Lbs. (0.68 kg) of Vistamaxx ® VM 1120 |
| --- | --- |
| Solvent: | 25 Lbs. (11.3 kg) of carbon tetrachloride |
| Sulfuryl chloride: | 300 ml. |
| Azo initiator: | Vazo ® 64 [2,2'-Azobisisobutyronitrile] |
| Reactor temp.: | 89°-93° C. |
| Reaction time: | 209 minutes |

By Schoniger analysis, the chlorosulfonated polymer contained Cl = 50.7 wt. % and S = 1.4 wt. %

What is claimed is:

1. A chlorosulfonated propylene/olefin copolymer composition comprising at least one chlorosulfonated propylene/olefin copolymer having 0.5 to 55 weight percent chlorine and 0.15 to 5 weight percent sulfur, based on total weight of said chlorosulfonated propylene/olefin copolymer, and wherein said chlorosulfonated propylene/olefin copolymer is produced from a propylene/olefin copolymer comprising copolymerized units of 70 to 98 weight percent propylene and 2 to 30 weight percent, based on total weight of said propylene/olefin copolymer, of an olefin selected from the group consisting of i) ethylene and ii) an alpha-olefin having 4 to 20 carbon atoms, said propylene/olefin copolymer having a ratio of Mw/Mn less than 3.5.

2. A chlorosulfonated propylene/olefin copolymer composition of claim 1 wherein said weight percent chlorine is between 1 and 45 and said weight percent sulfur is between 0.2 and 3.

3. A chlorosulfonated propylene/olefin copolymer composition of claim 2 wherein said weight percent chlorine is between 1 and 35 and said weight percent sulfur is between 0.5 and 2.

4. A chlorosulfonated propylene/olefin copolymer composition of claim 1 wherein said propylene/olefin copolymer comprises copolymerized units of 80 to 95 weight percent propylene and 5 to 20 weight percent of an olefin.

5. A chlorosulfonated propylene/olefin copolymer composition of claim 1 wherein said olefin is ethylene.

6. A chlorosulfonated propylene/olefin copolymer composition of claim 1 wherein said propylene/olefin copolymer has a density between 0.85 and 0.89 g/cm$^3$.

* * * * *